United States Patent Office.

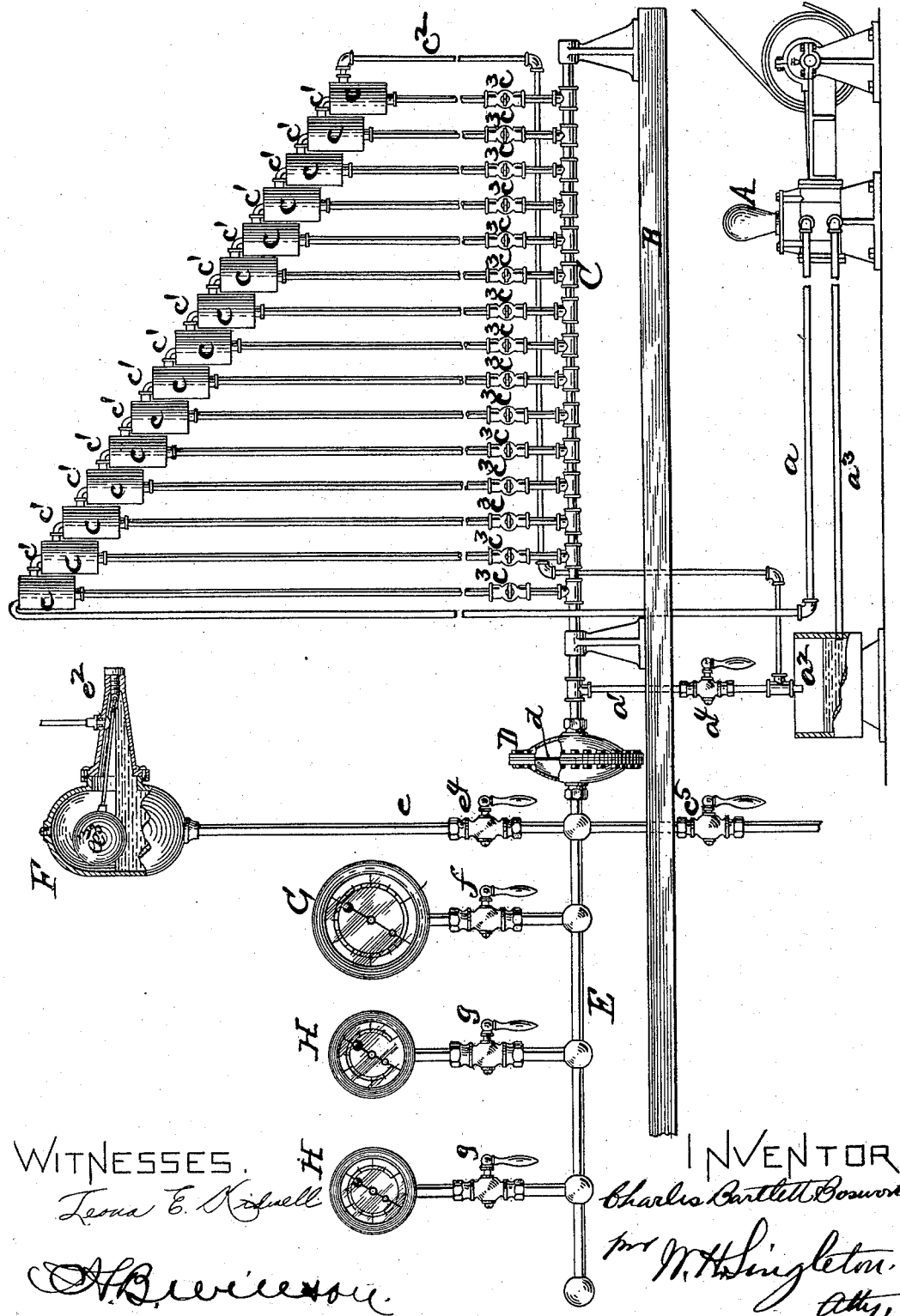

CHARLES BARTLETT BOSWORTH, OF EVERETT, MASSACHUSETTS, ASSIGNOR TO THE CROSBY STEAM GAGE AND VALVE COMPANY, OF BOSTON, MASSACHUSETTS.

PRESSURE-GAGE TESTER.

SPECIFICATION forming part of Letters Patent No. 585,883, dated July 6, 1897.

Application filed January 24, 1896. Serial No. 576,678. (No model.)

*To all whom it may concern:*

Be it known that I, CHARLES BARTLETT BOSWORTH, a citizen of the United States, residing at Everett, in the county of Middlesex and State of Massachusetts, have invented certain new and useful Improvements in Pressure-Gage Testers; and I do hereby declare the following to be a full, clear, and exact description of the invention, such as will enable others skilled in the art to which it appertains to make and use the same.

This invention relates to a pressure-gage tester or device for testing pressure-gages.

The ordinary method for adjusting and testing pressure-gages is by a pump, which forces the pressure into the gage to be tested, as well as a standard test-gage at the same time. This standard gage is used to determine the pressure to be expressed upon the dial of the gage to be tested. In other words, the latter gage is adjusted to the pressure shown upon the dial of the test-gage, as induced by the action of the pump upon it. In such case the accuracy of the standard gage has to be determined by some of the well-known methods of testing it.

My device consists in using liquid weights acting upon a diaphragm, which transmits these weights through some intermediary, as water, lying in the passage between the diaphragm and the gage to be tested, thus permitting the actual weight to be marked upon the dial without the use of any standard other than that of the liquid weights, which in such case become the standard. It consists in the erection of a series of tubes of such heights as shall give the pressure required of them. This series of tubes is filled in my device by mercury, which is raised by a pump to the top of the tube, which represents the highest pressure intended to be shown upon the gage to be tested. Leading from the upper part of this tube at the point where is determined the pressure of the mercury in this tube is an overflow to a shorter tube by it, the latter having a similar overflow from its upper end at such height as shall keep within the tube a column of mercury equal to the pressure desired, which goes to another shorter tube, and so on in like manner down to the shortest tube, which expresses the lowest pressure to be determined by the mecurial column as a liquid weight acting upon the diaphragm. As these columns are all under control by each having a cock so located at the bottom as to hold the tube full of mercury the operator is able to exert upon the gage to be tested a pressure equal to that exerted by the mercury from any particular tube. As these are all predetermined, it becomes an easy matter to do so.

The drawing shows a side view of the apparatus with parts in section.

In the drawing the letter A is a pump which forces mercury through the pipe $a$ to the top of the highest column or tube $c$. The column $c$ will be of the height determined by the weight of mercury per square inch in height as shall yield a pressure equal to the highest desired. When this is determined in this pipe, an overflow is inserted therein, as shown by $c'$, to the pipe next lower, which in height denotes the next lower pressure desired. Thence in the same way are the other columns erected with their corresponding overflows, thus giving a series of pressures each less than the other before it, determined by the mercury and user. The lowest or shortest column is intended to be a height equal to the weight of ten pounds per square inch. From the top of this column, at the point where it is necessary to maintain the height of mercury for such pressure, is an overflow, a tube $e^2$ leading directly to the tank $a^2$. This through the pipe $a^3$ makes a complete circuit for the flow of the mercury from the pump while it is in operation, during which all of the tubes are filled, and so kept filled in use by the abundance of the supply thus furnished. Each of these tubes enters a common pipe C, which goes directly to the diaphragm-chamber D, thus permitting the mercury in each of the tubes or all of them to flow directly through the pipe C to such diaphragm-chamber D. Each of these tubes $c\,c$ has a cock $c^3$, which controls the column of mercury within it. The pipe C has a connecting-pipe $a'$, which descends to the mercury tank or cistern $a^2$. In this connecting-pipe is a cock $a^4$, which when the tubes are used for testing a gage is closed. The diaphragm-chamber D has in the center thereof a partition or diaphragm $d$, made of rubber or other flexible material suitable for the service required of it. While one side of the diaphragm-chamber as divided by the partition $d$ receives the mercury, the other side is open to a pipe E, which leads directly to the gages to be adjusted and tested. This pipe E has rising from it, near to the diaphragm-chamber D, a vertical pipe $e$, which has upon its upper end at a height as intended in this device, which shall be equal to five pounds pressure per square inch of water in height, a chamber F, shown in section. This chamber has within it a ball-cock $e^3$, which operates a valve $e^2$ in the pipe above it leading to a continuous water-supply. The purpose of this chamber F is to maintain constantly and automatically a height of water therein which shall be equal to the weight of five pounds pressure per square inch, as above stated. The pipe $e$ has within it cocks $e^4$ and $e^5$. The latter is for the purpose of discharging the water from the gages on the pipe E upon the closing of the former $e^4$. Located upon pipe E are three gages G H H. The gage G corresponds in its notation upon the dial to several tubes and serves as an index to the operator to quickly read the pressure which has been exerted through the mercurial columns upon the gages to be tested, H H. Each of these gages has below it a cock $f$ $g$ $g$, respectively, for the purpose of shutting off the pressure upon them in order to remove them. The columns and gages are mounted upon a table B by means of suitable brackets, as shown.

The operator, desiring to test the gages H H, closes the cock $e^5$, opens the cock $e^4$, which permits the water from the chamber F to flow into the pipe E, thence into the gages and that portion of the diaphragm-chamber D open to it, thus exerting upon them, in accordance with the plan, a weight or pressure of five pounds to the square inch. He then closes the cock $e^4$, and closing the cock $a^4$ opens the cock $c^3$ in the column of mercury representing the pressure next desired by him to be shown upon the dial of the gages to be tested. Thus the mercury immediately flows into the pipe C, filling it and that portion of the diaphragm-chamber D into which the pipe C enters, and exerts a pressure upon the diaphragm $d$, which is communicated through the intermediate agency of the water to the gages, and there indicates upon the dial such pressure desired. This goes on according to the will of the operator through the entire range of pressures of the gages to be tested whose accuracy he has determined.

The same method is followed in determining upon a new gage the position of the index for any given pressures, in such way marking on the dial the location which the index will take under the pressure exerted upon it through the mercury-columns.

The object of the five-pound water-pressure in the gage-tester is as follows: In the first place it is necessary that there shall be some substantially solid medium between the diaphragm, upon one side of which the mercury acts, and the gages to be tested, so that any pressure or weight of the mercury upon the diaphragm shall instantly be transmitted to the gages. In the second place it is necessary also that the gage shall be tested at a pressure of five pounds as the first unit of comparison. The reason that this is done is that in most gages the notations on the dials are in aliquot parts of five pounds each, although some gages have these parts ten pounds and even twenty pounds, while again in certain cases the parts are one pound. As water well serves as the medium for communicating the pressure upon the diaphragm to the gage it is used, and particularly is it necessary because of the economy with which it can be used. As the height of the column of water weighing five pounds is not great and it can be easily maintained, it is deemed advisable to thus permit the first five-pound pressure to be ascertained and transmitted to the gage by it.

Mercury could not flow to the gage for two reasons at least; first, that it would be wasteful; second, that coming in contact with the brass Bourdon tubes or other parts of the brass gage it would injure them by its affinity for such material. The first pressure of five pounds having been transmitted by the water-column the operator can proceed to test the gage with mercury prudently and rapidly. Upon the conclusion of the work it is then easy to cut off the water-column and allow the contents of the pipe between the diaphragm and the gage to run to waste.

Having described the invention, what is claimed is—

1. An apparatus for testing pressure-gages which consists of a number of fluid-columns of different heights; a pipe common to such columns, such pipe having an intercepting diaphragm, the columns being on one side of such diaphragm and the pipe being provided upon the opposite side of the diaphragm with connections for gages, in combination with a fluid-pressure device having a fixed pressure, such device being attached to that portion of the pipe to which the gage connections are attached, as set forth.

2. The combination of the pump, A; the pipe, $a$; the series of columns or tubes, $c$, of different heights; the pipe, C, common to all the columns, $c$; the overflow-pipe, $c'$, connecting the tops of the columns; the pipe, E, provided with the connections for the gages; the diaphragm between the pipes, C and E, and a fixed pressure device connected to the pipe, E, as set forth.

In testimony whereof I affix my signature in presence of two witnesses.

CHARLES BARTLETT BOSWORTH.

Witnesses:
 ARTHUR L. BOWKER,
 OMAR H. GIBBS.